United States Patent [19]
Shimazawa et al.

[11] Patent Number: 6,081,114
[45] Date of Patent: Jun. 27, 2000

[54] METHOD AND APPARATUS FOR TESTING MAGNETIC HEAD WITH MAGNETORESISTIVE ELEMENT

[75] Inventors: Kouji Shimazawa; Masanori Sakai, both of Nagano, Japan

[73] Assignee: TDK Corporation, Tokyo, Japan

[21] Appl. No.: 09/024,402

[22] Filed: Feb. 17, 1998

[30] Foreign Application Priority Data

Feb. 17, 1997 [JP] Japan ................................ 9-046955

[51] Int. Cl.⁷ .......................... G01R 33/12; G11B 5/455
[52] U.S. Cl. .............................. 324/210; 324/537
[58] Field of Search .................. 324/210, 212, 324/252, 537; 360/25, 27, 31

[56] References Cited

U.S. PATENT DOCUMENTS

| | | |
|---|---|---|
| 5,150,050 | 9/1992 | Genheimer et al. ............. 324/212 |
| 5,206,590 | 4/1993 | Dieny et al. . | |
| 5,212,445 | 5/1993 | Meyer ............................ 324/212 |
| 5,422,571 | 6/1995 | Gurney et al. . | |
| 5,479,098 | 12/1995 | Yokoyama et al. ............. 324/212 |
| 5,708,358 | 1/1998 | Ravipati ......................... 324/252 |
| 5,760,982 | 6/1998 | Stein .......................... 324/210 X |

FOREIGN PATENT DOCUMENTS 59-180820  10/1984  Japan ..................... 324/210

*Primary Examiner*—Gerard Strecker
*Attorney, Agent, or Firm*—Arent Fox Kintner Plotkin & Kahn

[57] ABSTRACT

A method of testing a magnetic head with a spin-valve MR element having a pinned direction, includes a step of reproducing magnetic information recorded on a magnetic medium by the spin-valve MR element of the magnetic head to be tested to generate a reproduced signal, the information being recorded on the magnetic medium by using a rectangular wave current with a predetermined pattern, and a step of judging whether the pinned direction of the spin-valve MR element is correct in accordance with a relationship between wave shape of the reproduced signal and the predetermined pattern.

12 Claims, 10 Drawing Sheets

METHOD AND APPARATUS FOR TESTING MAGNETIC HEAD WITH MAGNETORESISTIVE ELEMENT

FIELD OF THE INVENTION

The present invention relates to a method and apparatus for testing a magnetic head with a magnetoresistive (MR) element. utilizing the spin-valve effect.

DESCRIPTION OF THE RELATED ART

Due to the recent demand for higher density in a hard disk device (HDD), it, has been required to develop a high sensitive and high power output magnetic head. To serve the requirements, a magnetic head with a spin-valve element which is one of elements providing the giant MR effect is provided (U.S. Pat. Nos. 5,206,590 and 5,422,571).

The spin-valve element has a sandwiched structure with two ferromagrnetic material thin-film layers magnetical separated by a non-magnetic material thin-film layer. An antiferromagnetic material thin-film layer is deposited on and in contact with one of the two uncoupled ferromagnetic layers so as to produce an exchange biasing magnetic field at their boundary and to apply the biasing magnetic field to this ferromagnetic layer. Therefore, this one ferromagnetic layer (pinned -layer) receives the biasing magnetic field, whereas the other ferromagnetic layer (free layer) receives no biasing magnetic field so that magnetization switching (inversion) is introduced by different magnetic fields between the two ferromagnetic layers. The magnetization directions of the two ferromagnetic layers (pinned and free layers) therefore change between in parallel and in antiparallel with each other so that the electrical resistivity of this spin-valve MR element greatly varies to obtain the giant MR effects.

Output characteristics of this spin-valve MR element is determined depending upon an angle between magnetization directions in the two ferromagnetic layers (pinned and free layers). The magnetization direction in the free layer is easily changed in response to the direction of magnetic field from a magnetic record medium, whereas the magnetization direction in the pinned layer is fixed to one direction (pinned direction) by means of the exchange coupling with the antiferromagnetic layer.

If the pinned direction changes from its correct direction, the angle between the magnetization directions in the pinned Layer and the free layer changes causing the output characteristics to deteriorate. Thus, for the magnetic head with the spin-valve MR element, it is very important to control the pinned direction at the correct direction.

However, there is no technology for easily detecting with reliability whether tile pinned direction of the spin-valve MR head is correctly controlled. This may cause some problems in mass production of HDDs. Namely, when some electric charges are applied to the terminals of the MR elements due to certain reason during manufacturing processes such as the wafer process of the magnetic heads and the mechanical working process, or during assembling processes of completed heads to the HDD, the pinned direction of the spin-valve MR element may be changed or inverted and thus various characteristics of the head may vary causing incorrect reproduction of the magnetically recorded signal. The change or inversion of the pinned direction may be caused by heat and magnetic field generated by the applied electric charges.

SUMMARY OF THE INVENTION

It is therefore an object of the present invention to provide method and apparatus for testing a magnetic head with a spin-valve MR element, whereby whether the pinned direction of the spin-valve MR head is correctly controlled can be easily detected with reliability.

According to the present invention, a method of testing a magnetic head with a spin-valve MR element having a pinned direction, includes a step of reproducing magnetic information recorded on a magnetic medium by the spin-valve MR element of the magnetic head to be tested to generate a reproduced signal, the information being recorded on the magnetic medium by using a rectangular wave current with a predetermined pattern, and a step of judging whether the pinned direction of the spin-valve MR element is correct, in accordance with a relationship between wave shape of the reproduced signal and the predetermined pattern.

Magnetic information recorded on a magnetic medium by using the current with a predetermined pattern are actually reproduced by the spin-valve MR element, to be tested. Then, whether the pinned direction of the spin-valve MR element is correct or not is judged by checking that the reproduced wave shape has a predetermined relationship with the pattern of the recording current. Thus, according to the present invention, whether the pinned direction of the spin-valve MR element, is correct or not, can be easily judged with reliability only from the wave shape of the signal reproduced by the MR element to be tested with respect to the recorded pattern. Furthermore, since the test method according to the present invention can be realized in the final read/write test process which will be execute(d after manufacturing processes of the magnetic head without exception, no additional process is necessary for this method. Thus, realization of the test method of the present invention is very easy.

It is preferred that the rectangular wave current has a predetermined pattern with a positive duration and a negative duration which are different from each other, that the longer one of the durations is predetermined, and that whether the pinned direction of the spin-valve MR element is correct is judged by comparing a positive duration of the reproduced signal with a negative duration of the reproduced signal. This method does not need to synchronize the leading edge of the reproduced signal as is done in the previous methods. Thus, realization of this method is very easy.

It is preferred that the rectangular wave current has a predetermined pattern with a leading edge to be written at a reference position of the magnetic medium, that the leading edge has a predetermined polarity, and that whether the pinned direction of the spin-valve MR element is correct, is judged in accordance with a polarity of a leading edge of the reproduced signal.

According to the present invention, also, an apparatus for testing a magnetic head with a spin-valve MR element having a pinned direction, includes a duration calculation unit, receiving a reproduced signal generated by the spin-valve MR element of the magnetic head to be tested, for calculating a positive duration and a negative duration of the received reproduced signal, the spin-valve MR element reproducing magnetic information recorded on a magnetic medium to generate the reproduced signal, the information being recorded on the magnetic medium by using a rectangular wave current having a predetermined pattern with a positive duration and a negative duration which are different from each other, longer one of the durations being predetermined, and a judgment unit for judging whether the pinned direction of the spin-valve MR element is correct by comparing the calculated positive duration with the calculated negative duration.

It is preferred that the duration calculation unit includes a calculation unit for calculating a positive duration and a negative duration of the reproduced signal by detecting an interval of peaks of the reproduced signal.

This calculation unit may include a unit for differentiating the reproduced signal to generate a differential signal, a zero-cross detection unit for detecting a first timing at which the differential signal crosses zero from positive to negative and for detecting a second timing at which the differential signal crosses zero from negative to positive, and a unit for obtaining intervals between the first and second timings.

The calculation unit may include a unit for comparing level of the reproduced signal with two threshold levels to generate first and second outputs, and a unit for obtaining intervals between the first and second outputs.

According to the present invention, further, an apparatus for testing a magnetic head with a spin-valve MR element having a pinned direction, includes a leading edge extraction unit, receiving a reproduced signal generated by the spin-valve MR element of the magnetic head to be tested, for extracting a leading edge of the received reproduced signal, the spin-valve MR element reproducing magnetic information recorded on a magnetic medium to generate the reproduced signal, the information being recorded on the magnetic medium by using a rectangular wave current having a predetermined pattern with a leading edge to be written at a reference position of the magnetic medium, the leading edge having a predetermined polarity, and a judgment unit for judging whether the pinned direction of the spin-valve MR element is correct in accordance with a polarity of the extracted leading edge of the reproduced signal.

It is preferred that the leading edge extraction unit includes a unit for extracting a leading edge of the received reproduced signal by using an index signal generated when the magnetic head locates at a reference position on the magnetic medium.

The leading edge extraction unit may include a unit for comparing level of the received reproduced signal with a threshold level to generate a compared result output, and a unit for calculating a logical product of the compared result output and the index signal.

According to the present invention, also, an apparatus for testing a magnetic head with a spin-valve MR element having a pinned direction, includes a periodic leading edge extraction unit, receiving a reproduced signal generated by the spin-valve MR element of the magnetic head to be tested, for extracting leading edges of respective periods of the received reproduced signal, the spin-valve MR element reproducing magnetic information recorded on a magnetic medium to generate the reproduced signal, the information being recorded on the magnetic medium by using a rectangular wave current having a predetermined pattern with a leading edge to be written at a reference position of the magnetic medium, the leading edge having a predetermined polarity, and a judgment unit for judging whether the pinned direction of the spin-valve MR element is correct in accordance with polarities of the extracted leading edges of the respective periods of the reproduced signal.

It is preferred that, the periodic leading edge extraction unit includes a unit for extracting leading edges of the respective periods of the received reproduced signal by using a signal corresponding to the rectangular wave current, which is synchronous with an index signal generated when the magnetic head locates at a reference position on the magnetic medium.

The periodic leading edge extraction unit may include a unit for comparing level of the received reproduced signal with a threshold level to generate a compared result output, and a unit for calculating a logical product of the compared result output and signals which are synchronous with leading edges of respective periods of the signal corresponding to the rectangular wave current.

Further objects and advantages of the present invention will be apparent from the following description of the preferred embodiments of the invention as illustrated in the accompanying drawings.

DESCRIPTION OF THE PREFERRED EMBODIMENTS

Before describing the embodiments of the present invention, basic principle of the present invention will be explained.

Figure 1:
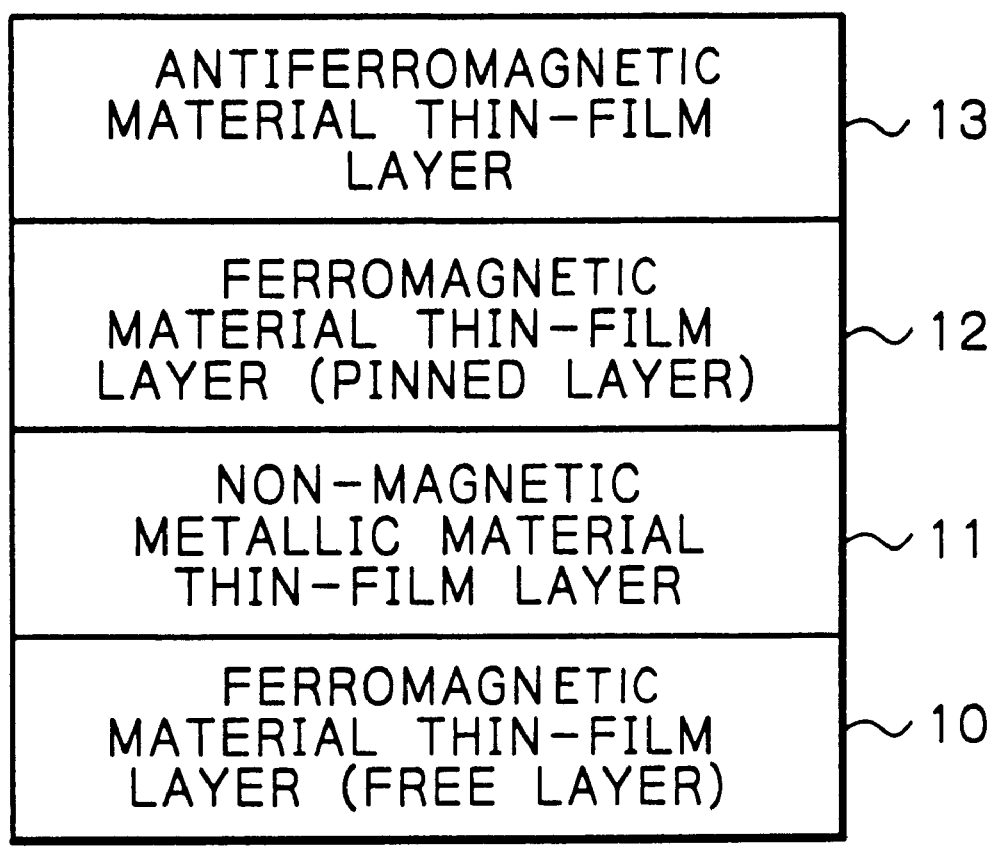
FIG. 1 shows a cross-sectional view illustrating a basic configuration of a multi-layered spin-valve structure.

In FIG. 1 which illustrates a multi-layered spin-valve structure of the present invention, reference numerals 10 and 12 are two ferromagnetic material thin-film layers. The multi-layered spin-valve structure has a sandwiched structure with the two layers 10 and 12 magnetically separated with each other by a non-magnetic metallic material thin-film layer 11. On the layer 12 is deposited an antiferromagnetic material thin-film layer 13. Exchange bias magnetic field generated at the interface between the ferromagnetic layer 12 and the antiferromagnetic layer 13 is applied to the ferromagnetic layer (a pinned layer) 12 to pin this layer 12. The layer 10 is a free layer to which no exchange biasing magnetic field is applied.

Figure 2A:
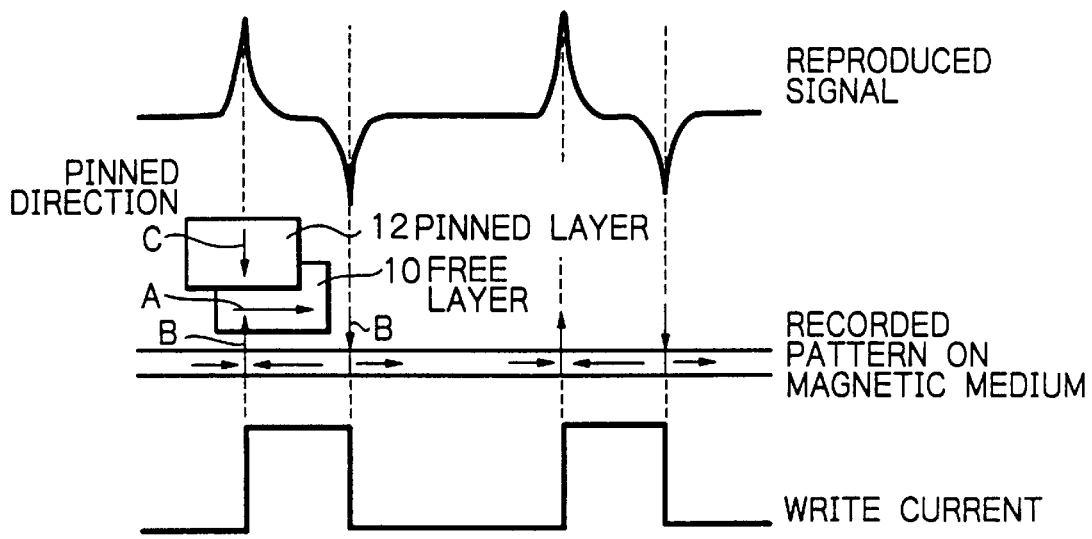
FIGS. 2a and 2b illustrate relationship between the pinned direction of the spin-valve structure and the reproduced signals thereof.
Figure 2B:
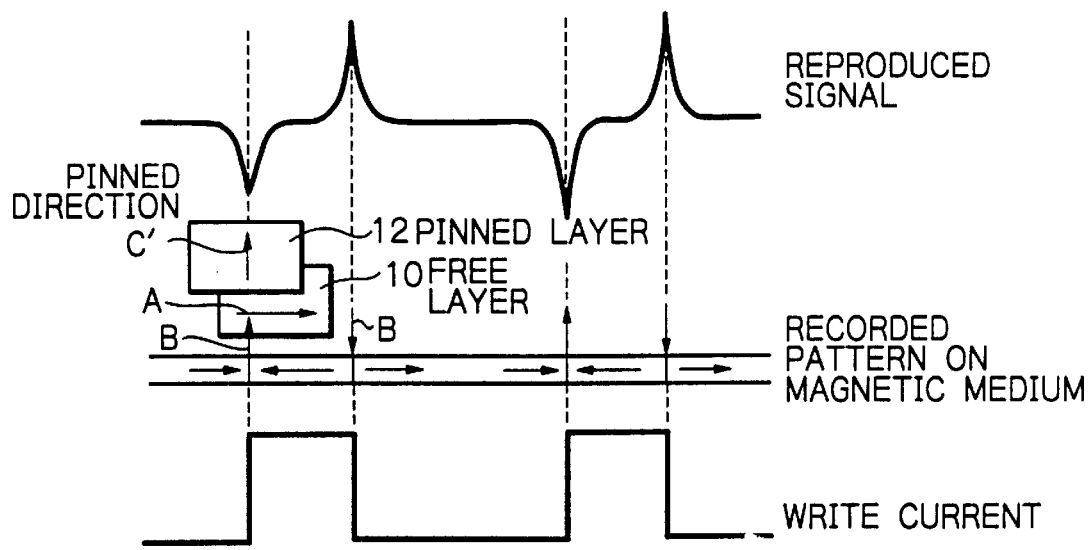

FIGS. 2a and 2b illustrate the relationship between the pinned direction of the multi-layered spin-valve structure and the reproduced signal thereof. The free layer 10, which is biased in a direction shown by an arrow A as shown in FIG. 2a, is magnetized in response to upward or downward direction, shown by arrows B, of leakage magnetic field generated in accordance with recorded pattern on a magnetic medium and thus the reproduction is executed. The reproduced signal, when the pinned direction in the pinned layer 12 is in the correct direction as shown by an arrow in FIG. 2a, provides alternating polarity in order as positive, negative, positive and negative in response to the recorded pattern. Whereas, when the pinned direction in the pinned layer 12 is inverted (to the incorrect direction) as shown by an arrow C' in FIG. 2b, the reproduced signal provides alternating polarity in opposite order as negative, positive, negative and positive in response to the same recorded pattern.

Figure 3:
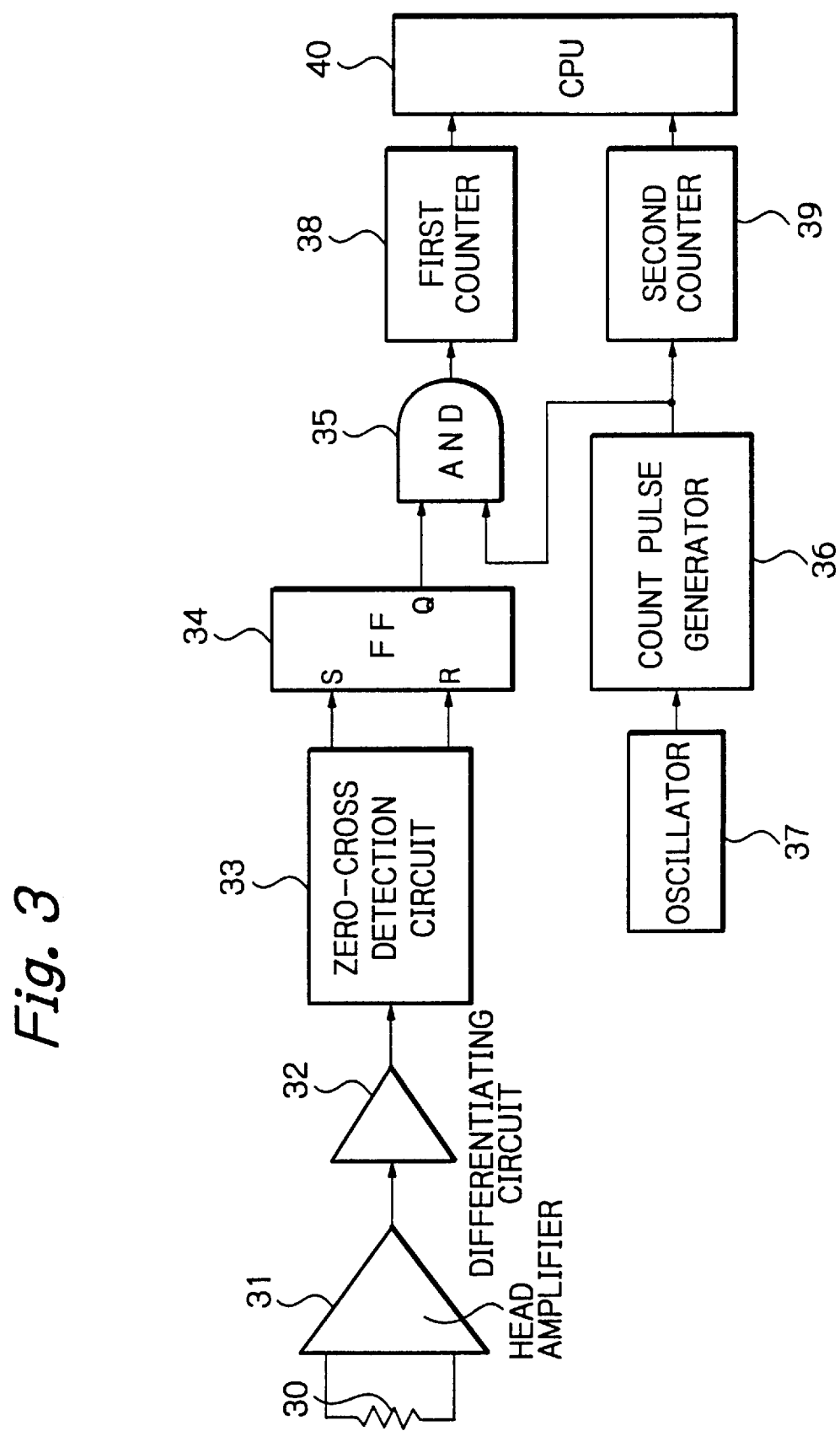
FIG. 3 shows a block diagram schematically illustrating a circuit structure of a preferred embodiment of an apparatus for testing a magnetic head according to the present invention.

FIG. 3 schematically illustrates a circuit structure of a preferred embodiment of an apparatus for testing a magnetic head. In the figure, reference numeral 30 denotes a spin-valve MR element of the magnetic head. To output terminals of the spin-valve MR element, 30, a head amplifier 31, a differentiating circuit. 32, a zero-cross detection circuit 33 and a flip-flop) 34 arc connected in sequence in this order. An output terminal Q of the flip-flop 34 is connected to one input terminal of an AND circuit 35. To the other input terminal of the AND circuit, 35, an output terminal of a count pulse generator 36 is connected. An oscillator 37 is connected to an input terminal of the generator 36. To an output terminal of the AND circuit 35, an input terminal of a first counter 38 is connected, and to the output terminal of the generator 36 an input terminal of a second counter 39 is connected. Output terminals of the first and second counters 38 and 39 are connected to an input terminal of a CPU 40.

Figure 4:
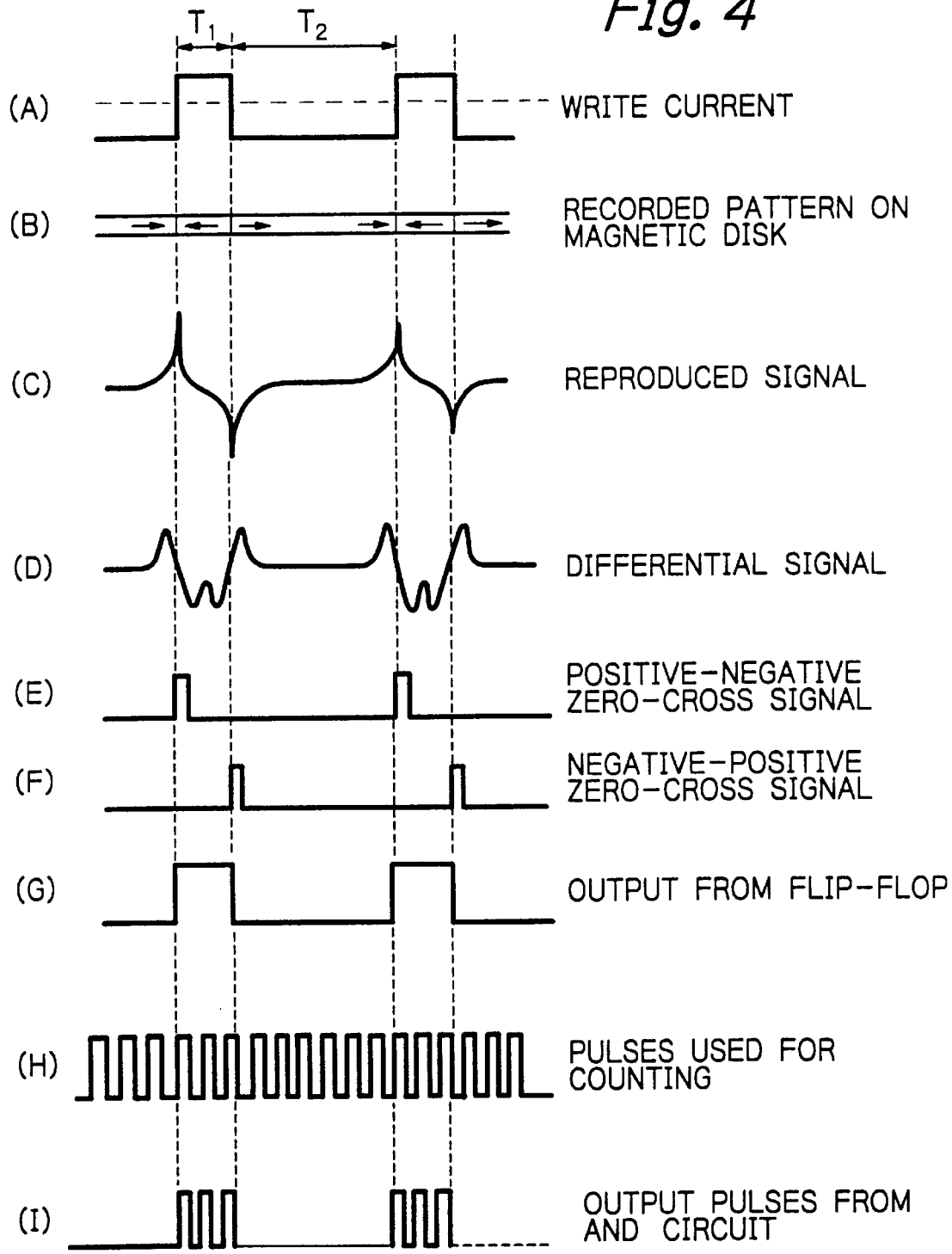
FIG. 4 illustrates wave shapes of signals in the test apparatus of the embodiment shown in FIG. 3.

Hereinafter, operations of this test apparatus will be described. Before testing the magnetic head, a magnetic disk (not shown) for testing the head, on which magnetic pattern has been already recorded by a write current with a predetermined pattern, is prepared. In this embodiment, the write current has a rectangular wave shape with a pattern that a positive duration $T_1$ and a negative duration $T_2$ has a relationship of $T_1<T_2$ or $_1/T_2<1$ as shown in FIG. 4(A). Thus, on the track of the magnetic disk, a magnetic pattern as shown in FIG. 4(B) is recorded.

The magnetic head to he tested is attached in the test apparatus so that the head opposes the rotating magnetic disk and then a constant sense current is supplied to the spin-valve MR element 30. Under the above conditions, output voltage across the MR client 30 is derived. FIG. 4(C) shows the output voltage or the reproduced signal from the MR element 30 when its pinned direction is correct.

The output voltage of the MR element 30 is amplified at the head amplifier 31 and then applied to the differentiating circuit 32 to be differentiated. The differential signal as shown in FIG. 4(D) is applied to the zero-cross detection circuit 33. The detection circuit 33 generates individual pulses when its input signal crosses the zero from positive to negative and when the input signal crosses the zero from negative to positive, respectively. This circuit. 33 may be constituted by for example a typical zero-cross comparator, a one-shot multivibrator for producing a pulse at, the rising edge of the output of the comparator and a one-shot multivibrator for producing a pulse at the falling edge of the output of the comparator. FIG. 4(E) shows signals, generated by the detection circuit. 33, indicating the zero-cross points from positive to negative, and FIG. 4(F) shows signals, generated by the detection circuit 33, indicating the zero-cross points from negative to positive. These signals are applied to the set and reset input terminals S and R of the flip-flop 34, respectively to obtain flip-flop output as shown in FIG. 4(G).

Pulses used for countering as shown in FIG. 4(H) are provided from the count, pulse generator 36, connected with the oscillator 37 and applied to the other input terminal of the AND circuit 35 and to the second counter 33. Since the output from the flip-flop 34 as shown in FIG. 4(G) is applied to the one input terminal of the AND circuit 35, the count pulses are passed through the AND circuit 35 and applied to tie first counter 38 only when the flip-flop output is at high level. FIG. 4(I) indicates these pulses applied to the first counter 38.

The first and second counters 38 and 39 count the respectively applied pulses for about, one period $(T_1+T_2)$ of the magnetic pattern recorded in the disk. Thus, output or counted result. $N_1$ from the first counter 38 represents the number of the pulses in a period $T_1$ which corresponds to a period from the positive peak to the next negative peak of the reproduced signal within the counting period $_1+T_2$. Whereas, output or counted result $N_2$ from the second counter 39 represents the number of the pulses in the counting period $T_1+T_2$.

The counted results $N_1$ and $N_2$ of the counters 38 and 39 are applied to the CPEU 40 to calculate a ratio of $N_1$ and $N_2-N_1$ $(N_1/(N_2-N_1))$. $N_1$ corresponds to the period from the positive peak to the next negative peak of the reproduced signal, and $N_2$ corresponds to the period from the negative peak to the next, positive peak of the reproduced signal. If the pinned direction of the spin-valve MR element 30 is correct, since the reproduced signal is as shown in FIG. 4(C), $N_1/(N_2-N_1)$ corresponds to $T_1/T_2$. Namely, $N_1/(N_2-N_1)<1$. Contrary to this, if the pinned direction of the MR element 30 is inverted to the incorrect direction, since the reproduced signal is inverted is described with reference FIG. 2b, the flip-flop output becomes the inversion of that shown in FIG. 4(G). Thus, $N_1/(N_2-N_1)$ corresponds to $T_2/T_1$, namely, $N_1/(N_2-N_1)>1$. Actually, the CPU 40 calculates $N_1/(N_2-N_1)$, and judges whether the pinned direction of the spin-valve MR element 30 is in the correct direction or not by comparing the calculated result $N_1/(N_2-N_1)$ with 1. The method of judging whether the pinned direction is correct or incorrect after the calculation of $N_1$ and $N_2-N_1$ is not limited to the aforementioned method but can be realized by various methods.

As will be apparent from the above-description, according to this embodiment, the detection whether the pinned direction of the spin-valve MR element 30 is correct, or incorrect can be easily executed with reliability in accordance with the dynamic characteristics of this element 30.

Figure 5:
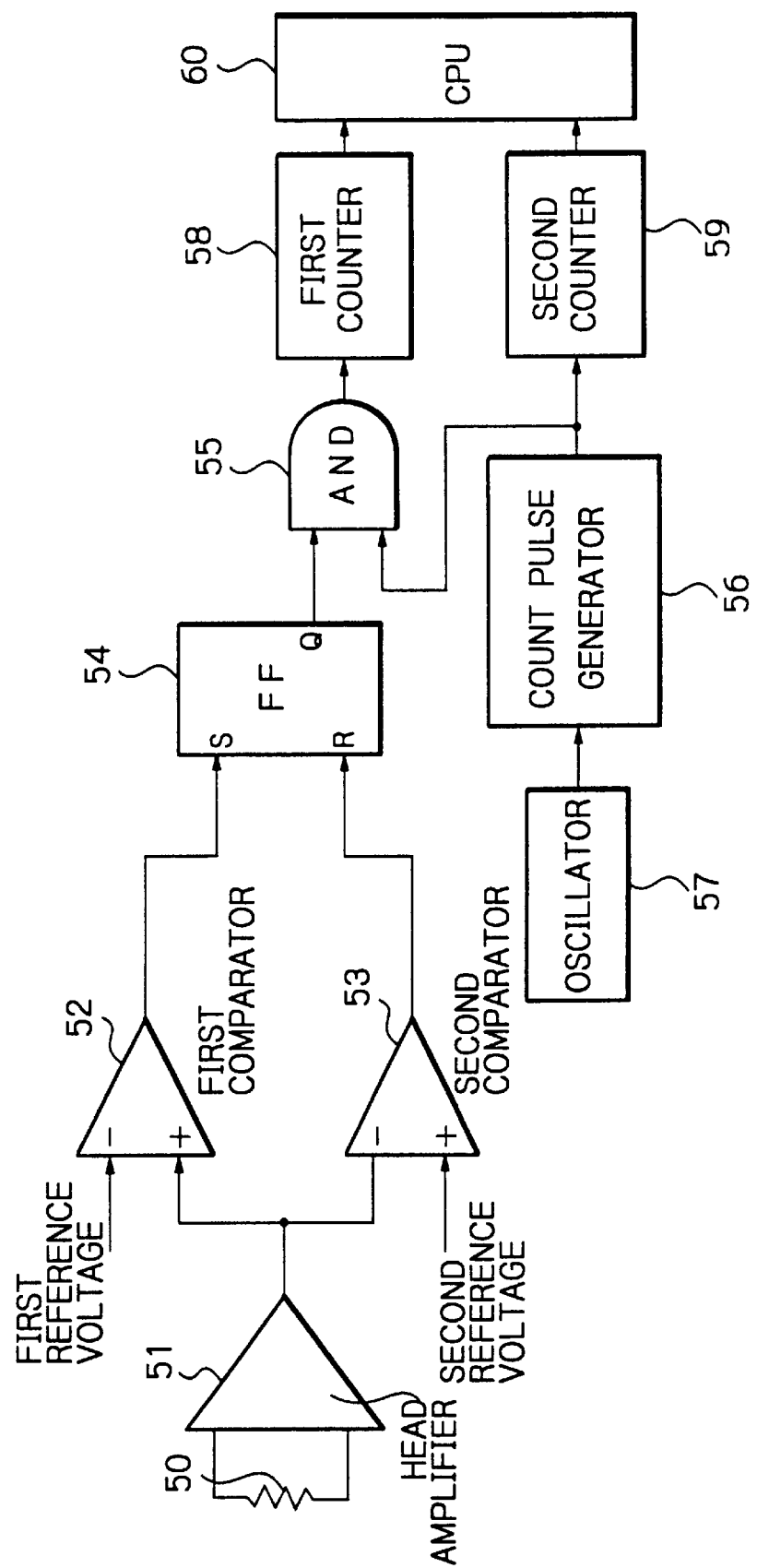
FIG. 5 shows a block diagram schematically illustrating a circuit structure of another embodiment of an apparatus for testing a magnetic head according to the present invention.

FIG. 5 schematically illustrates a circuit structure of another embodiment of an apparatus for testing a magnetic head. In the figure, reference numeral 50 denotes a spin-valve MR element of the magnetic head. To output terminals of the spin-valve MR element 50, a head amplifier 51 is connected. To an output, terminal of the amplifier 51, one input terminals of first, and second comparators 52 and 53 are connected. Reference voltages are applied to the other input, terminals of the comparators 52 and 53. Output terminals of the comparators 52 and 53 are connected to set; and reset input terminals S and R of a flip-flop 54, respectively. An output terminal Q of the flip-flop 54 is connected to one input terminal of an AND circuit 55. To the other input terminal of the AND) circuit 55, an output terminal of a count pulse generator 56 is connected. An oscillator 57 is connected to an input terminal of the generator 56. To an output terminal of the AND circuit 55, an input terminal of a first counter 58 is connected, and to the output terminal of the generator 56 an input terminal of a second counter 59 is connected. Output, terminals of the first and second counters 58 and 59 are connected to an input, terminal or a CPU 60.

Hereinafter, operations of this test, apparatus will be described. Before testing the magnetic head, the magnetic disk for testing the head similar to that, in the embodiment of FIG. 3 is prepared.

Figure 6:
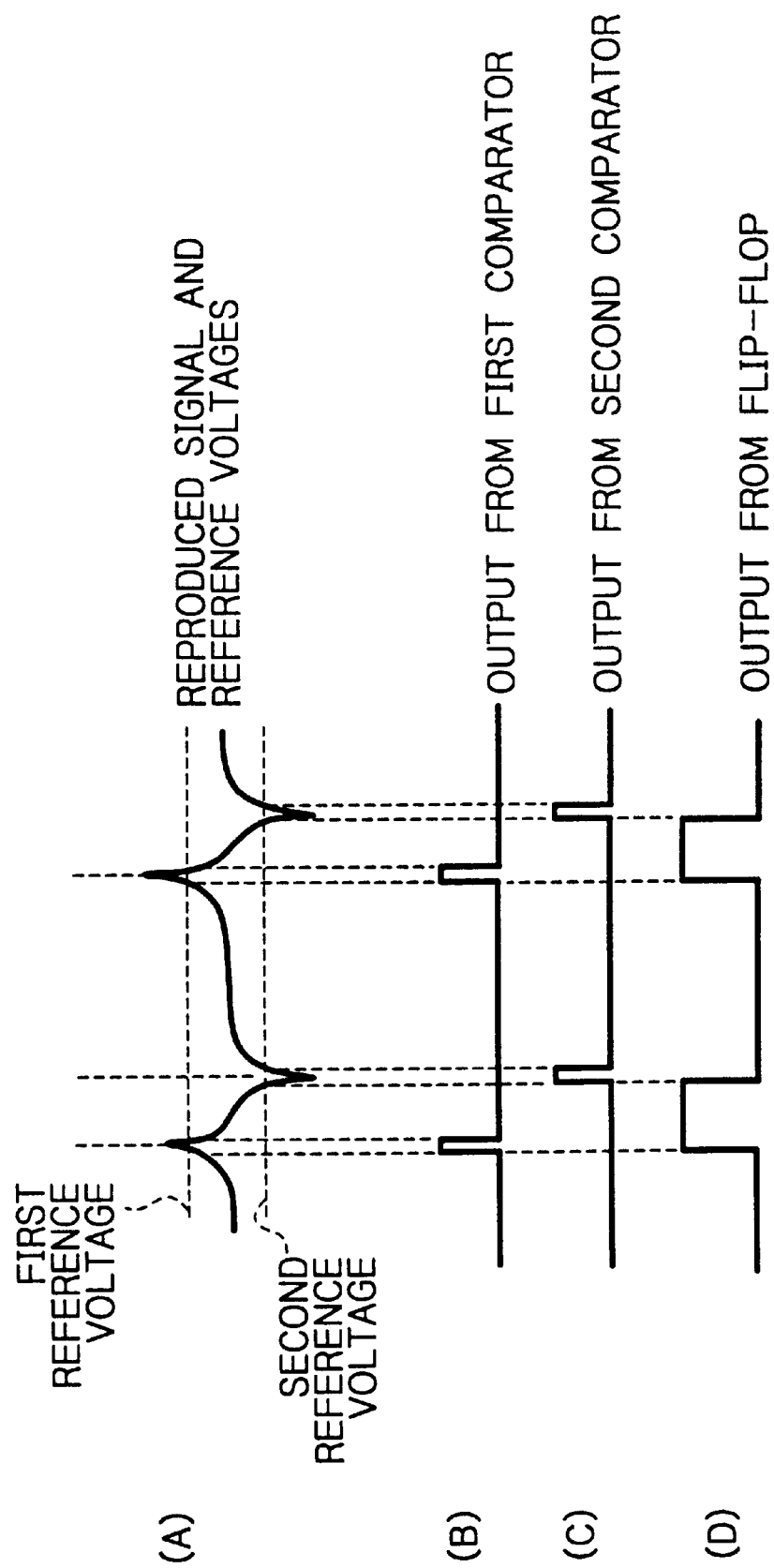
FIG. 6 illustrates wave shapes of signals in the test, apparatus of the embodiment shown in FIG. 5.

As similar to the embodiment of FIG. 3, the magnetic head to be tested is attached in the test apparatus so that the head opposes the rotating magnetic disk and then a constant sense current is supplied to the spin-valve MR element 50. Under the above conditions, output voltage across the MR element 50 is derived. FIG. 6(A) shows the output voltage or the reproduced signal from the MR element 50 when the pinned direction thereof is correct.

The output voltage or the MR element 50 is amplified at, the head amplifier 51 and then applied to the first and second comparators 52 and 53 so as to be compared with first and second reference voltages. Namely, at the first comparator 52, the output voltage is compared with the first reference voltage shown in FIG. 6(A), and at the second comparator 53, the output voltage is compared with the second reference voltage also shown in FIG. 6(A). The first reference voltage for the first comparator 52 is determined so as to slice positive peak side portion of the output voltage from the MR element 50, and the second reference voltage for the second comparator 53 is determined so as to slice negative peak side portion of the output, voltage. FIG. 6(B) and (C) indicate outputs from the first, and second comparators 52 and 53, respectively. These outputs are applied to the set and reset, input terminals of the flip-flop 54, respectively to obtain flip-flop output as shown in FIG. 6(D).

Operations of the AND circuit 55, the count pulse generator 56, the oscillator 57, the first counter 58, the second counter 59 and the CPU 60 are the same as the operations in the embodiment of FIG. 3.

In this embodiment, also, the CPU 60 calculates $N_1/(N_2-N_1)$, and judges whether the pinned direction of the spin-valve MR element 50 is the correct direction or not; by comparing the calculated result, $N_1/(N_2-N_1)$ with 1. Thus, according to this embodiment, the detection whether the pinned direction of the element 50 is correct, or incorrect can be easily executed with reliability in accordance with the dynamic characteristics of this element 50.

Figure 7:
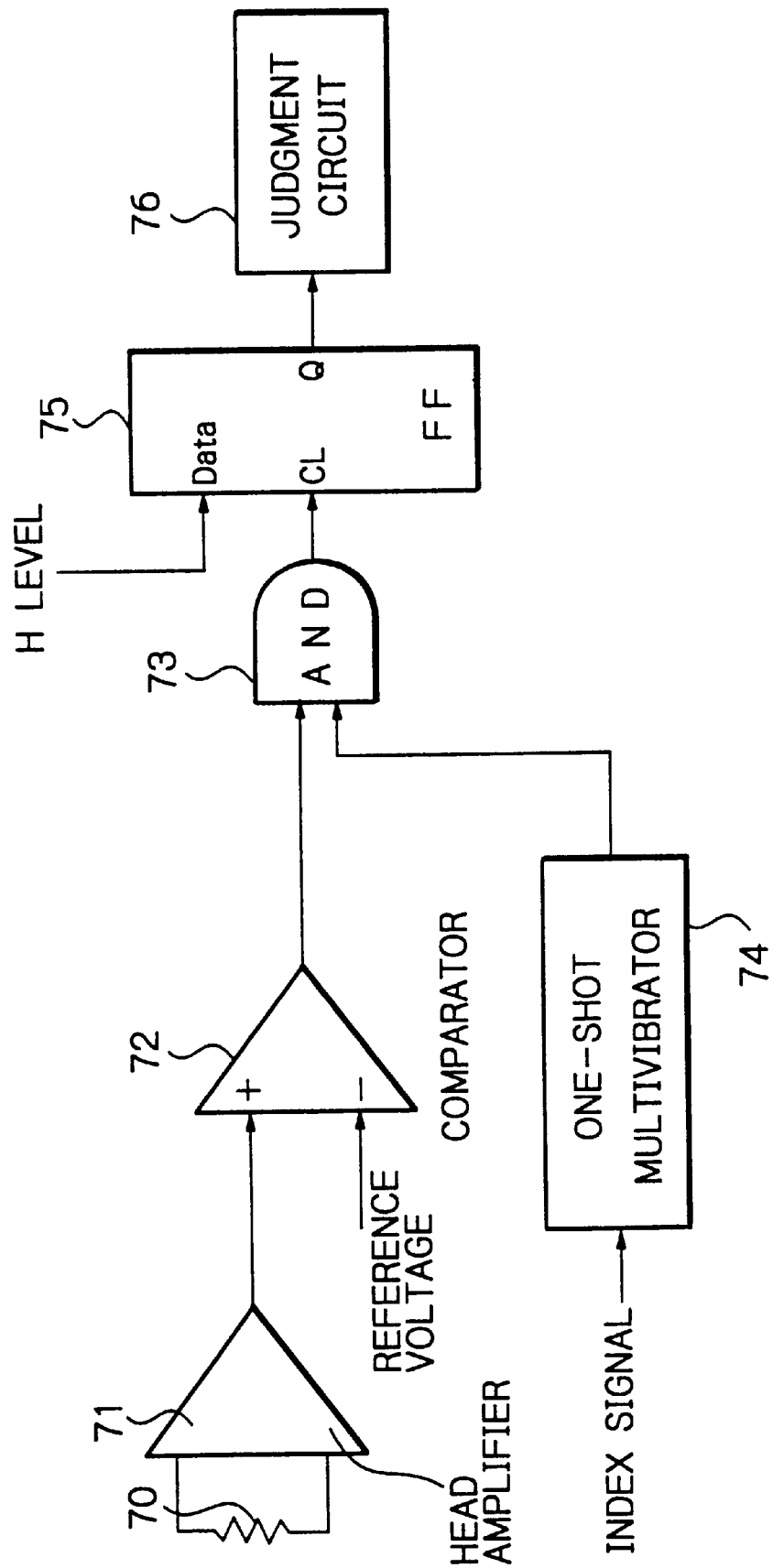
FIG. 7 shows a block diagram schematically illustrating a circuit structure of a further embodiment of an apparatus for testing a magnetic head according to the present invention.

FIG. 7 schematically illustrates a circuit structure of a further embodiment of an apparatus for testing a magnetic head. In the figure, reference numeral 70 denotes a spin-valve MR element of the magnetic head. To output terminals of the spin-valve MR element 70, a head amplifier 71 is connected. A one input terminal of a comparator 72 is connected to an output terminal of the amplifier 71. Reference voltage is applied to the other input terminal of the comparator 72. An output terminal of the comparator 72 is connected to one input terminal of an AND circuit 73. To the other input terminal of the AND circuit 73, an output of a one-shot multivibrator 74 is connected. To this multivibrator 74, an index signal generated when the magnetic head locates at a reference position of each track on the magnetic disk is applied. An output terminal of the AND circuit 73 is connected to a clock input terminal CL of a flip-flop 75 with a data input terminal which is maintained at H level. An output terminal Q of the flip-flop 75 is connected to a judgment circuit 76.

Hereinafter, operations of this test apparatus will be described. Before testing the magnetic head, a magnetic disk (not shown) for testing the head, on which magnetic pattern has been a already recorded by a write current with a predetermined pattern, is prepared. In this embodiment, the write current, has a rectangular wave shape with a pattern in which a positive duration and a negative duration are not limited as that in the embodiments of FIGS. 3 arid 5, but a polarity of its leading edge which is synchronous with a reference position of each track is predetermined. For purpose of easier understanding, following is described on the assumption that the magnetic recording on each track of the magnetic disk has been carried out by a write current with a pattern in which a polarity of its leading edge to be written at the reference position of each track is positive.

Figure 8:
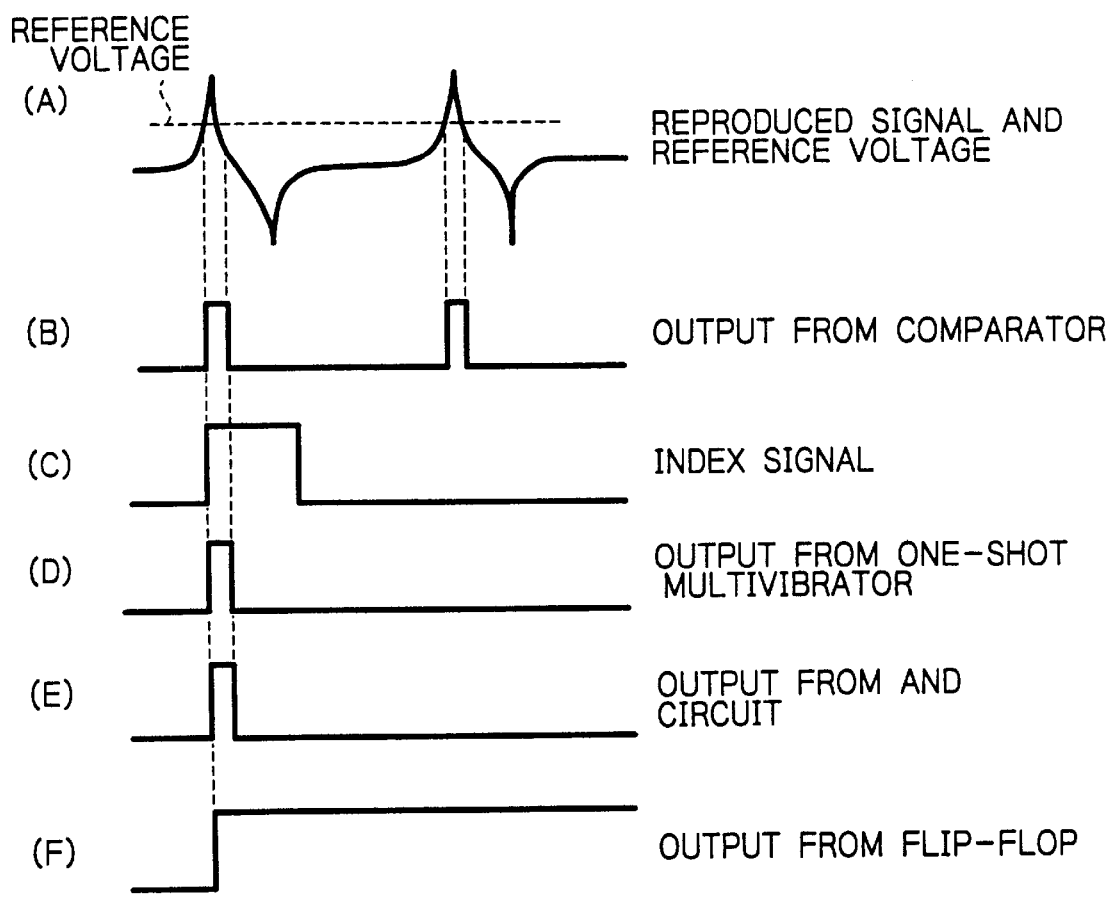
FIG. 8 illustrates wave shapes of signals in the test apparatus of the embodiment shown in FIG. 7.

The magnetic head to he tested is attached in the test apparatus so that the head opposes the rotating magnetic disk and then a constant sense current is supplied to the spin-valve MR element 70. Under the above conditions, output voltage across the MR element 70 is derived. FIG. 8(A) shows the output, voltage or the reproduced signal from the MR element 70 when the pinned direction thereof is correct.

The output voltage of the MR element 70 is amplified at the head amplifier 71 and then applied to the comparator 72 so as to be compared with a reference voltage. The reference voltage for the comparator 72 is determined so as to slice positive peak side portion of the output voltage from the MR element 70 as shown in FIG. 8(A). FIG. 8(B) indicates output from the comparator 72. The output, from the comparator 72 is applied to the one input terminal of the AND circuit 73.

An index signal, shown in FIG. 8(C), generated when the magnetic head locates at a write or read reference position of each track (one reference position for each track) on the magnetic disk is applied to the one-shot multivibrator 74. This index signal is a synchronous signal with respect to a specified position of the magnetic disk, and is generated from a spindle motor onces for each rotation of the magnetic disk. Therefore, a signal obtained by varying a time constant or a duration of the index signal, as shown in FIG. 8(D), is outputted from the multivibrator 74. This output is applied to the other input terminal of the AND circuit 73.

The AND circuit 73 calculates a logical product of the output from the comparator 72 and the duration-varied signal from the multivibrator 74. Thus, if the comparator output exists during the duration of the duration-varied signal, a pulse as shown in FIG. 8(E) is outputted from the AND circuit 73. In other words, when the pinned direction of the spin-valve MR element 70 is correct, since the reproduced signal has a wave shape as shown in FIG. 8(A), the pulse as shown in FIG. 8(E) is outputted from the AND circuit 73. This pulse is applied to the clock input terminal CL of the flip-flop 75 which operates as a latch circuit. Thus, in response to the applied pulse, the output of the flip-flop 75 is changed to and maintained at. "1" or H level as shown in FIG. 8(F). When the output of "1" or H level is applied from the flip-flop 75, the judgment circuit 76 judges that the pins-led direction is correct;. Whereas, when the pinned direction of the spin-valve MR element 70 is inverted to be an incorrect pinned direction, since the reproduced signal is inverted as described with reference FIG. 2b, the comparator output does not, appear during the duration of the duration-varied signal, no pulse is outputted from the AND circuit 73. As a result, the flip-flop output is maintained at "0" or L level. Thus, in this case, the judgment, circuit 76 judges that the pinned direction is incorrect.

As will be understood from the above-description, according to this embodiment, the detection whether the pinned direction of the spin-valve MR element 70 is correct or incorrect can be also easily executed with reliability in accordance with the dynamic characteristics of this element 70.

Figure 9:
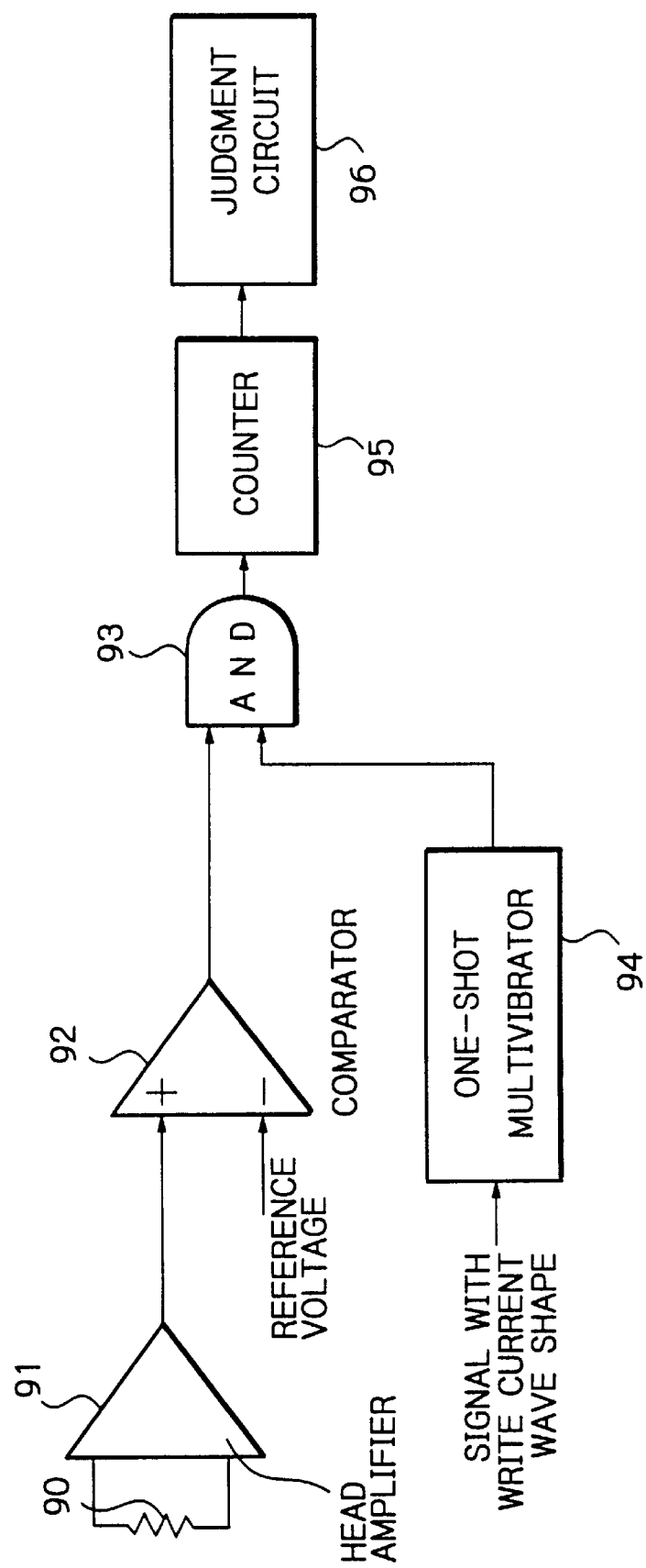
FIG. 9 shows a block diagram schematically illustrating a circuit structure of a still further embodiment of an apparatus for testing a magnetic head according to the present invention.

FIG. 9 schematically illustrates a circuit structure of a still further embodiment of an apparatus for testing a magnetic head. In the figure, reference numeral 90 denotes a spin-valve MR element of the magnetic head. To output terminals of the spin-valve MR element 90, a head amplifier 91 is connected. A one input terminal of a comparator 92 is connected to an output, terminal of the amplifier 91. Reference voltage is applied to the other input terminal of the comparator 92. An output, terminal or the comparator 92 is connected to one input terminal of an AND circuit 93. To the other input terminal of the AND circuit, 93, an output of a one-shot multivibrator 94 is connected. To this multivibrator 94, a signal with a wave shape similar to the write current wave shape (rectangular wave shape) which is supplied to an inductive write element (not shown) of the magnetic head is applied. An output terminal of the AND circuit 93 is connected to an input terminal of a counter 95. An output terminal of the counter 95 is connected to a judgment circuit 96.

Hereinafter, operations of this test apparatus will be described. Before testing the magnetic head, a magnetic disk (not shown) for testing the head, on which magnetic pattern has been already recorded by a write current with a predetermined pattern, is prepared. In this embodiment, the write current has a rectangular wave shape with a pattern in which a polarity of its leading edge which is synchronous with a reference position of each track is predetermined. For purpose of easier understanding, following is described on the assumption that the magnetic recording on each track of the magnetic disk has been carried out by a write current with a pattern in which a polarity of its leading edge to be written at the reference position of each track is positive.

Figure 10:
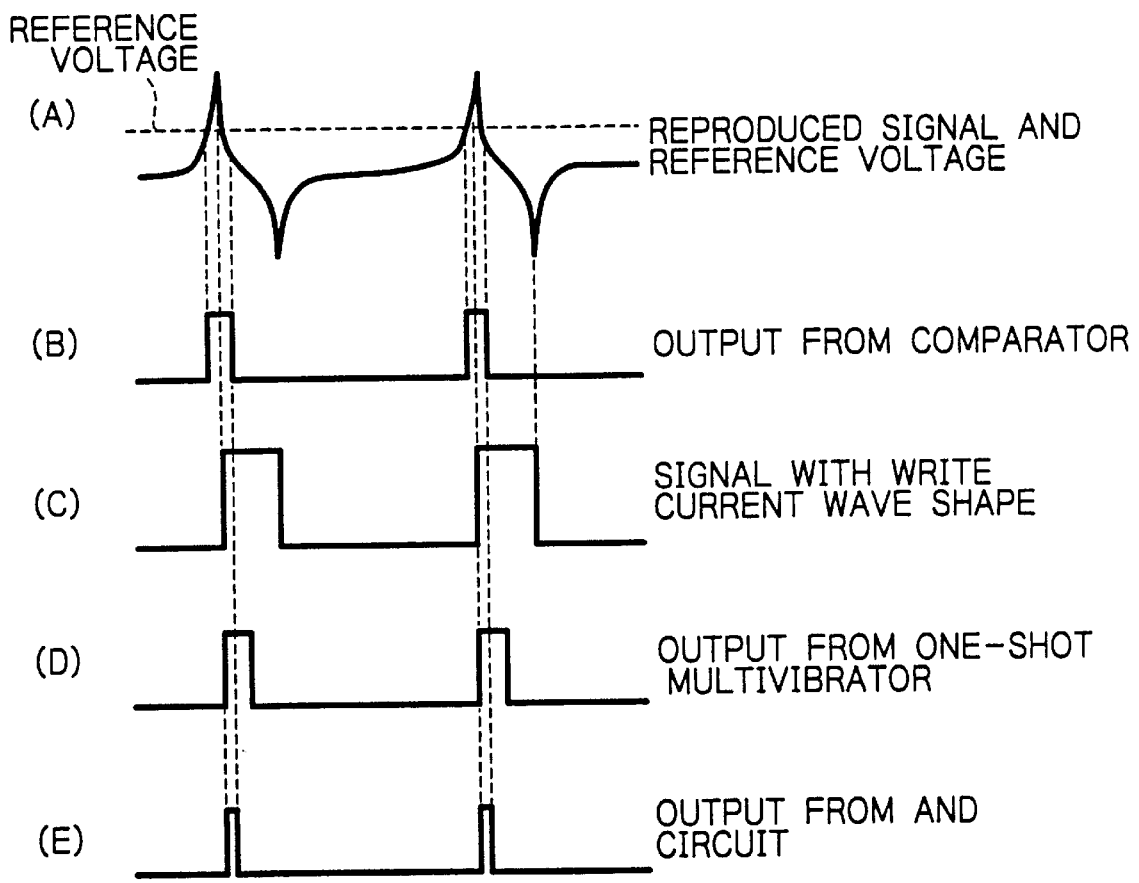
FIG. 10 illustrates wave shapes of signals in the test apparatus of the embodiment shown in FIG. 9.

The magnetic head to be tested is attached in the test, apparatus so that the head opposes the rotating magnetic disk and then a constant sense current is supplied to the Spin-valve MR element 90. Under the above conditions, output voltage across the MR element 90 is derived. FIG. 10(A) shows the output voltage or the reproduced signal from the MR element, 90 when the pinned direction thereof is correct.

The output voltage of the MR element 90 is amplified at, the head amplifier 91 and then applied to the comparator 92 so as to be compared with a reference voltage. The reference voltage for the comparator 92 is determined so as to slice positive peak side portion of the output voltage from the MR element 90 as shown in FIG. 10(A). FIG. 10(B) indicates output from the comparator 92. The output from the comparator 92 is applied to the one input terminal of the AND circuit 93.

A signal with a wave shape similar to the write current wave shape, shown in FIG. 10(C), is applied to the one-shot. Multivibrator 94. The leading edge position of this signal is synchronous with the index signal which is generated when the magnetic head locates at a write or read reference position of each track on the magnetic disk. Therefore, a signal obtained by varying a time constant or a duration of the signal with the write current wave shape, as shown in FIG. 10(D), is outputted from the multivibrator 94. This output is applied to the other input terminal of the AND circuit 93.

The AND circuit 93 calculates a logical product of the output from the comparator 92 and the duration-varied signal from the multivibrator 94. Thus, if the comparator output exists during the duration of the duration-varied signal, a pulse as shown in FIG. 10(E) is outputted from the AND circuit 93. In other words, when the pinned direction of the spin-valve MR element 90 is correct, since the reproduced signal has a wave shape as shown in FIG. 10(A), the pulse as shown in FIG. 10(E) is outputted from the AND circuit 93. This pulse is applied to the counter 95 which counts the number of the inputted pulses for a predetermined period of time. The counted number of the pulses is outputted from the counter 95 to the judgment circuit 96. When the pinned direction is correct, the number of pulses applied to the counter 95 during the predetermined counting period is equal to a known number. Thus, the judgment circuit 96 can judge that the pinned direction is correct based upon the counted result obtained from the counter 95. Whereas, when the pinned direction of the spin-valve MR element 90 is inverted to be an incorrect pinned direction, since the reproduced signal is inverted as described with reference FIG. 2b, the comparator output does not appear during the duration of the duration-varied signal, no pulse is outputted from the AND circuit 93. As a result, the judgment circuit 96 can judge that the pinned direction is incorrect based upon the counted result obtained from the counter 95.

As will be understood from the above-description, according to this embodiment, the detection whether the pinned direction of the spin-valve MR element 90 is correct or incorrect can be also easily executed with reliability in accordance with the dynamic characteristics of this element. 90. In the embodiment of FIG. 7, the pinned direction is judged in accordance with the result of one detecting operation executed at each track (at each period of the index signal) because the index signal generated by one for each track is utilized. However, in this embodiment, of FIG. 9, since detecting operation is executed at each period of the write current and the pinned direction is judged in accordance with the counted number of pulses each of which represents the result of the detecting operation, more correct and reliable judgment of the pinned direction can be expected.

In this embodiment, also, a flip-flop and a judgment circuit similar to the flip-flop 75 and the judgment circuit 76 described in the embodiment, of FIG. 7 can be used instead of the counter 95 and the judgment circuit 96.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of testing a magnetic head with a spin-valve magnetoresistive element having a pinned direction, comprising the steps of:

reproducing magnetic information recorded on a magnetic medium by the spin-valve magnetoresistive element of the magnetic head to be tested to generate a reproduced signal, said information being recorded on the magnetic medium by using a rectangular wave current having a predetermined pattern with a positive duration and a negative duration which are different from each other; and judging whether the pinned direction of said spin-valve magnetoresistive element is correct by comparing a positive duration of said reproduced signal with a negative duration of said reproduced signal.

2. A method of testing a magnetic head with spin-valve magnetoresistive element having a pinned direction, comprising the steps of:

reproducing magnetic information recorded on a magnetic medium by the spin-valve magnetoresistive element of the magnetic head to be tested to generate a reproduced signal, said information being recorded on the magnetic medium by using a rectangular wave current having a predetermined pattern with a leading edge to be written at a reference position of said magnetic medium, said leading edge having a predetermined polarity; and judging whether the pinned direction of said spin-valve magnetoresistive element is correct in accordance with a polarity of a leading edge of said reproduced signal.

3. An apparatus for testing a magnetic head with a spin-valve magnetoresistive element having a pinned direction, comprising:

a duration calculation means, receiving a reproduced signal generated by said spin-valve magnetoresistive element of the magnetic head to be tested, for calculating a positive duration and a negative duration of said received reproduced signal, said spin-valve magnetoresistive element reproducing magnetic information recorded on a magnetic medium to generate said reproduced signal, said information being recorded on the magnetic medium by using a rectangular wave current having a predetermined pattern with a positive duration and a negative duration which are different from each other; and a judgment means for judging whether the pinned direction of said spin-valve magnetoresistive element is correct by comparing the calculated positive duration with the calculated negative duration.

4. The apparatus as claimed in claim 3, wherein said duration calculation means includes a calculation means for calculating a positive duration and a negative duration of said reproduced signal by detecting an interval of peaks of said reproduced signal.

5. The apparatus as claimed in claim 4, wherein said calculation means includes means for differentiating said reproduced signal to generate a differential signal, a zero-cross detection means for detecting a first timing at which said differential signal crosses zero from positive to negative and for detecting a second timing at which said differential signal crosses zero from negative to positive, and means for obtaining intervals between said first and second timings.

6. The apparatus as claimed in claim 4, wherein said calculation means includes means for comparing level or said reproduced signal with two threshold levels to generate a first and second outputs, and means for obtaining intervals between said first and second outputs.

7. An apparatus for testing a magnetic head with a spin-valve magnetoresistive element having a pinned direction, comprising:

a leading edge extraction metals, receiving a reproduced signal generated by said spin-valve magnetoresistive element of the magnetic head to be tested, for extracting a leading edge of said received reproduced signal, said spin-valve magnetoresistive element reproducing magnetic information recorded on a magnetic medium to generate said reproduced signal, said information being recorded on the magnetic medium by using a rectangular wave current having a predetermined pattern with a leading edge to be written at a reference position of said magnetic medium, said leading edge having a predetermined polarity; and a judgment means for judging whether the pinned direction of said spin-valve magnetoresistive element is correct in accordance with a polarity of the extracted leading edge of said reproduced signal.

8. The apparatus as claimed in claim 7, wherein said leading edge extraction means includes means for extracting a leading edge of said received reproduced signal by using an index signal generated when the magnetic head locates at a reference position on said magnetic medium.

9. The apparatus as claimed in claim 7, wherein said leading edge extraction means includes means for comparing level of said received reproduced signal with a threshold level to generate a compared result output, and means for calculating a logical product of said compared result output and said index signal.

10. An apparatus for testing a magnetic head with a spin-valve magnetoresistive element having a pinned direction, comprising:

a periodic leading edge extraction means, receiving a reproduced signal generated by said spin-valve magnetoresistive element of the magnetic head to be tested, for extracting leading edges of respective periods of said received reproduced signal, said spin-valve magnetoresistive element reproducing magnetic information recorded on a magnetic medium to generate said reproduced signal, said information being recorded on the magnetic medium by using a rectangular wave current having a predetermined pattern with a leading edge to be written at a reference position of said magnetic medium, said leading edge having a predetermined polarity; and a judgment means for judging whether the pinned direction of said spin-valve magnetoresistive element is correct in accordance with polarities of the extracted leading edges of the respective periods of said reproduced signal.

11. The apparatus as claimed in claim 10, wherein said periodic leading edge extraction means includes means for extracting leading edges of the respective periods of said received reproduced signal by using a signal corresponding to the rectangular wave current which is synchronous with an index signal generated when the magnetic head locates at a reference position on said magnetic medium.

12. The apparatus as claimed in claim 10, wherein said periodic leading edge extraction means includes means for comparing level of said received reproduced signal with a threshold level to generate a compared result output, and means for calculating a logical product of said compared result output and signals which are synchronous with leading edges of respective periods of said signal corresponding to the rectangular wave current.

* * * * *